US009463692B2

(12) United States Patent
Usui

(10) Patent No.: US 9,463,692 B2
(45) Date of Patent: Oct. 11, 2016

(54) DISPLAY CONTROL DEVICE TO DISPLAY IMAGE DATA

(75) Inventor: Minoru Usui, Kawasaki (JP)

(73) Assignee: CYPRESS SEMICONDUCTOR CORPORATION, San Jose, CA (US)

( * ) Notice: Subject to any disclaimer, the term of this patent is extended or adjusted under 35 U.S.C. 154(b) by 340 days.

(21) Appl. No.: 12/569,193

(22) Filed: Sep. 29, 2009

(65) Prior Publication Data

US 2010/0085370 A1   Apr. 8, 2010

Related U.S. Application Data

(63) Continuation of application No. PCT/JP2007/056890, filed on Mar. 29, 2007.

(51) Int. Cl.
*B60K 35/00* (2006.01)
*G09G 5/00* (2006.01)
*G09G 5/36* (2006.01)
*G09G 5/40* (2006.01)
*G09G 3/36* (2006.01)
*G09G 5/395* (2006.01)
*G09G 5/393* (2006.01)
*G07C 5/12* (2006.01)

(52) U.S. Cl.
CPC ............... *B60K 35/00* (2013.01); *G09G 5/006* (2013.01); *G09G 5/363* (2013.01); *G09G 5/40* (2013.01); *G07C 5/12* (2013.01); *G09G 3/3674* (2013.01); *G09G 3/3685* (2013.01); *G09G 5/393* (2013.01); *G09G 5/395* (2013.01); *G09G 2340/0464* (2013.01); *G09G 2340/0471* (2013.01); *G09G 2340/0478* (2013.01); *G09G 2340/0485* (2013.01)

(58) Field of Classification Search
None
See application file for complete search history.

(56) References Cited

U.S. PATENT DOCUMENTS 4,951,038 A    8/1990 Yamamura
5,602,984 A *  2/1997 Mieras .......................... 345/557
(Continued)

FOREIGN PATENT DOCUMENTS

JP    61-29890 A    2/1986
JP    64-082095 A   3/1989
(Continued)

OTHER PUBLICATIONS

Japanese Final Decision of Rejection mailed Oct. 23, 2012, in counterpart Japanese Patent Application No. 2009-508777 (5 pages including partial English translation).
(Continued)

*Primary Examiner* — Maurice L McDowell, Jr.
*Assistant Examiner* — Donna J Ricks

(57) ABSTRACT

In the display of an image including a fixed background image and a variation image of the background image, at least one of the amount of data to be held and the amount of work to be processed is reduced. A display control device acquires pixel description data including a combination of position information for specifying a position on a pixel array and address information for specifying an address in an image storage unit of image data which is displayed at the position specified by the position information. Furthermore, the display control device reads out the image data from the address of the image storage unit specified by the address information and specifies the position on the pixel array specified by the image description data to the display to input the read out image data.

7 Claims, 10 Drawing Sheets

(56) References Cited

U.S. PATENT DOCUMENTS

| | | | |
|---|---|---|---|
| 6,396,473 B1* | 5/2002 | Callahan et al. | G09G 5/397 345/530 |
| 7,321,368 B2* | 1/2008 | Owen et al. | 345/541 |
| 2002/0011998 A1 | 1/2002 | Tamura | |
| 2002/0018058 A1 | 2/2002 | Tamura | |
| 2003/0214506 A1* | 11/2003 | Koselj et al. | 345/519 |
| 2004/0202380 A1* | 10/2004 | Kohler et al. | 382/275 |
| 2006/0061567 A1* | 3/2006 | Ouchi | 345/419 |
| 2008/0036763 A1* | 2/2008 | Chen et al. | 345/422 |
| 2008/0186319 A1* | 8/2008 | Boner | 345/545 |
| 2010/0033502 A1* | 2/2010 | Comps et al. | 345/634 |

FOREIGN PATENT DOCUMENTS

| | | | | |
|---|---|---|---|---|
| JP | 6482095 A | 3/1989 | | |
| JP | 01-311292 | 12/1989 | | |
| JP | 04-186295 A | 7/1992 | | |
| JP | 4186295 A | 7/1992 | | |
| JP | 04-277850 A | 10/1992 | | |
| JP | 08-171523 | 7/1996 | | |
| JP | 2000-296228 | * 10/2000 | | A63F 7/02 |
| JP | 2000-296228 A | 10/2000 | | |
| JP | 2001-222249 A | 8/2001 | | |

OTHER PUBLICATIONS

Japanese Office Action and English Translation dated May 29, 2012.
International Search Report for International Application No. PCT/JP2007/056890, mailed May 15, 2007.
International Preliminary Report on Patentability and Written Opinion of the International Searching Authority for International Application No. PCT/JP2007/056890, mailed Oct. 20, 2009.
Written Opinion of the International Searching Authority for International Application No. PCT/JP2007/056890 mailed May 15, 2007; 5 pages.

* cited by examiner

FIG.5

| INFORMATION TO BE DISPLAYED | POSITION OF PIXEL ARRAY TO BE DISPLAYED |
|---|---|
| DOOR D1 SENSOR | 0x200<br>0x210<br>.. |
| DOOR D2 SENSOR | |
| DOOR D3 SENSOR | |
| DOOR D4 SENSOR | |
| FOURTH DIGIT OF MILEAGE | |
| THIRD DIGIT OF MILEAGE | |
| SECOND DIGIT OF MILEAGE | |
| FIRST DIGIT OF MILEAGE | |
| .. | |

FIG.6

| INFORMATION TO BE DISPLAYED | ADDRESS OF SEGMENTAL IMAGE TO BE DISPLAYED |
|---|---|
| DOOR D1 OPENING IMAGE | 0x3100<br>0x3101<br>.. |
| DOOR D2 OPENING IMAGE | |
| DOOR D3 OPENING IMAGE | |
| DOOR D4 OPENING IMAGE | |
| NUMERAL 0 | 0x2900<br>0x2901<br>..<br>0x291F |
| NUMERAL 1 | |
| .. | |
| NUMERAL 9 | |

FIG.10

| Dest. | Source | Length |
|---|---|---|
| 0 | 0x8000 | 0x642 |
| 0x642 | 0x3000 | 0x001 |
| 0x643 | .. | 0x001 |
| .. | .. | |
| 0x699 | .. | 0x001 |
| 0x699 | .. | 0x001 |
| 0x700 | 0x8700 | 0x100 |
| .. | .. | .. |

DISPLAY CONTROL DEVICE TO DISPLAY IMAGE DATA

CROSS-REFERENCE TO RELATED APPLICATION

This is a continuation of Application PCT/JP2007/056890, filed on Mar. 29, 2007, now pending, the contents of which are herein wholly incorporated by reference.

FIELD

The present invention relates to a display device of an image including a pixel matrix.

BACKGROUND

The display device such as an LCD (Liquid Crystal Display) forms an image by controlling individual image forming elements called pixels. This type of display device includes a display unit capable of displaying a pixel array and a driver which drives the display unit. An information processing device such as a computer, which is connected to the display device and displays an image on the display device, gives a display instruction to the driver, inputs data that is to be displayed in respective pixels and displays the image. The information processing device linking up with the display device such as this includes a CPU (Central Processing Unit), a RAM (Random Access Memory), a ROM (Read Only Memory), a DMA (Direct Memory Access) controller, etc.

FIG. 1 illustrates an outline of processes by a conventional information processing device. This information processing device displays a fixed background image and a dynamic image against the background image. Herein, the background image connotes an image representing, e.g., a car body and is stored as a pixel array in an address "0x8000" through an address "0x87FF" on a flash ROM in FIG. 1. On the other hand, the dynamic image is an illustration of a door in an open state in the car body. Moreover, the dynamic image is exemplified by displaying sensor data of respective portions in the car body such as data of a mileage, a car speed, an inclination of the vehicle, a temperature etc.

The display of the image is executed in the following procedures.
(1) At first, a DMA controller reads the image data representing the car body from the ROM and develops the image data on the RAM.
(2) Next, the CPU rewrites a segmental image of a portion that is changed with vehicle data, such as the door in the open state and a mileage display area. Such image data is thereby organized as to display the car body including the door in the open state or the present mileage in a lower position in an image screen of the car body.
(3) An LCD controller outputs the image data organized on the RAM to the display device, e.g., an LCD.
[Patent document 1] Japanese Patent Laid-Open Publication No. H04-277850

SUMMARY

The present invention is a display control device linking up with an information processing device including an image storage unit and with a display device to display an image by setting image data for respective pixels of a pixel array, and to display on the display device the image data read from the image storage unit of the information processing device. The display control device acquires pixel description data containing a combination of position information specifying a position on the pixel array and address information specifying an address, on the image storage unit, of the image data that is displayed in the specified position. Further, the display control device reads the image data from the address, on the image storage unit, specified by the address information. Then, the display control device specifies the position on the pixel array, specified by the pixel description data and inputs the readout image data to the display device.

The object and advantage of the embodiment will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF DRAWINGS

FIG. 5 is a diagram of a structure of an arrangement information table;

FIG. 6 is a diagram of a structure of a segmental image address table.

FIG. 10 is a diagram illustrating a modified example of the descriptor.

DESCRIPTION OF EMBODIMENT(S)

An information processing device according to a best mode (which will hereinafter be termed an embodiment) will hereinafter be described with reference to the drawings. The technology is applicable to reduce at least one of the data quantity is retained and the operation quantity that is processed in displaying the image containing the fixed background image and the dynamic image against the background image. A configuration in the following embodiment is an exemplification, and the information processing device is not limited to the configuration in the embodiment.

Figure 1:
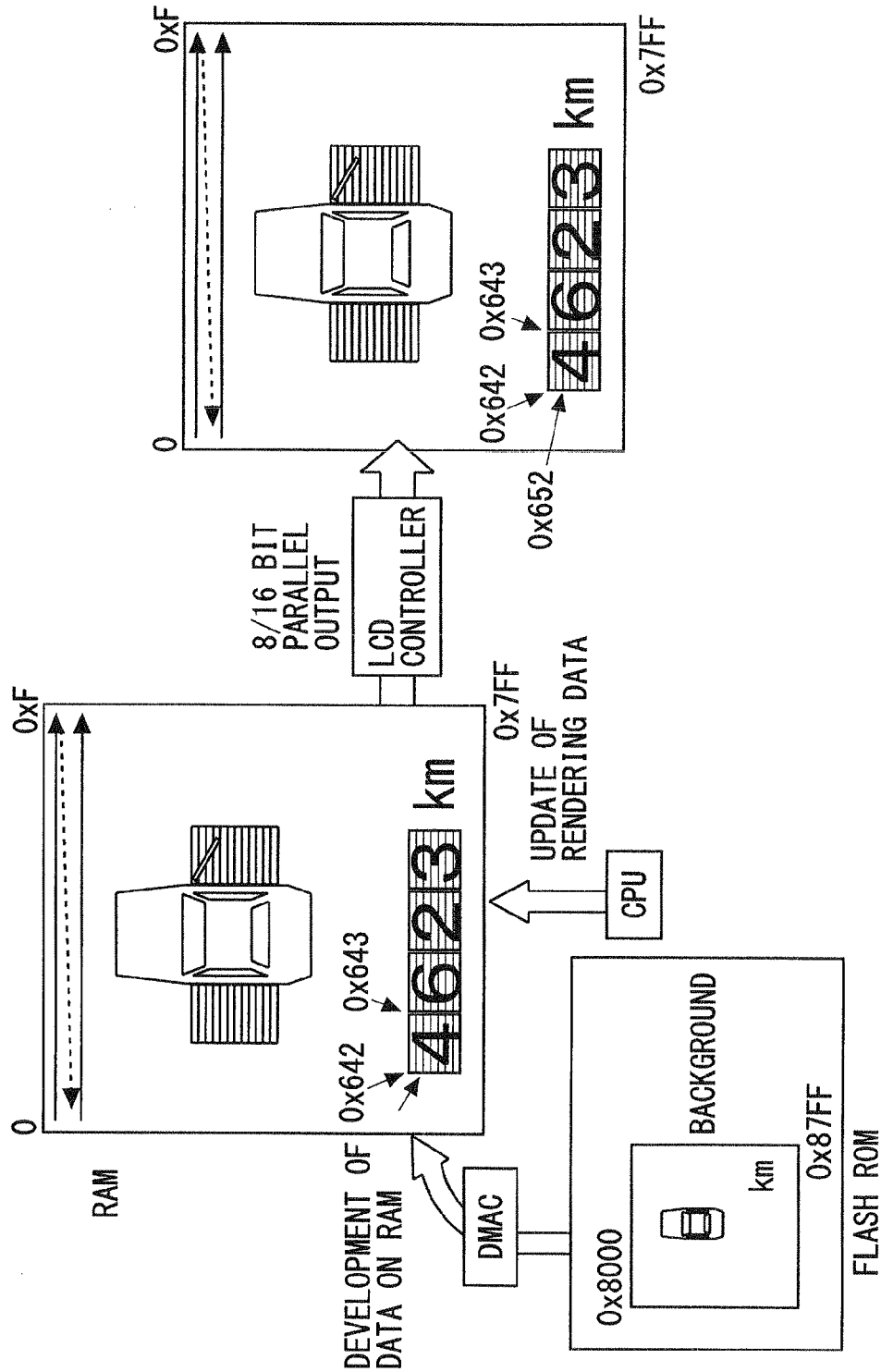
FIG. 1 is a diagram illustrating a processes by a conventional information processing device.
Figure 2:
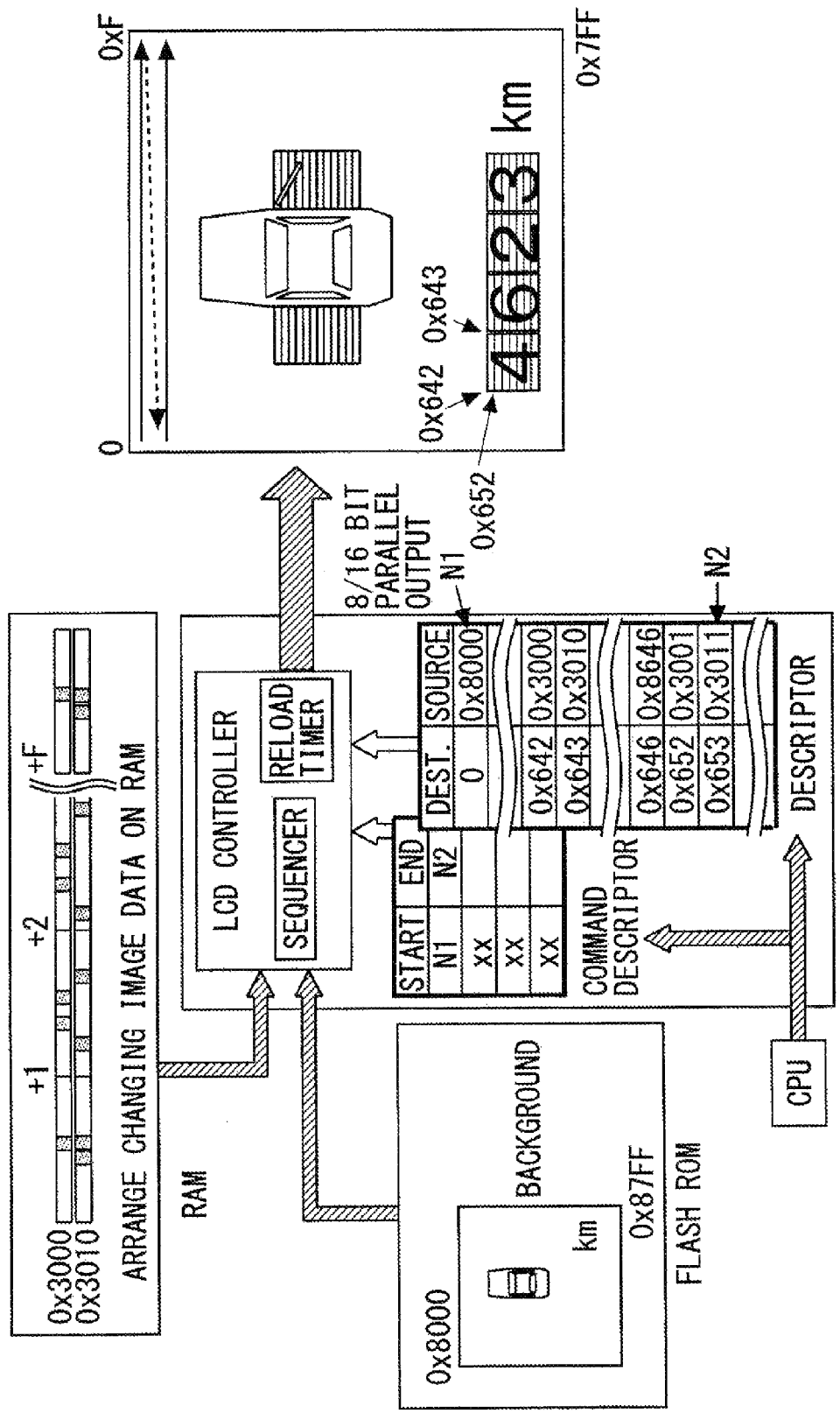
FIG. 2 is a diagram illustrating a processes by an information processing device according to one embodiment of the present invention.

FIG. 2 illustrates a process by the information processing device. Similarly to the case of FIG. 1, FIG. 2 also depicts a processing example in which images (picture) formed of the pixel arrays are displayed on the display device such as the LCD in a way that combines a background image defined as a fixed image with a dynamic image against the background image. The pixel arrays are arrays of dot patterns forming the image and also called dot matrices.

It is assumed also in FIG. 2 that the background image is stored in a flash ROM. On the other hand, the dynamic image is stored in a RAM (Random Access Memory) for a rewritable operation. Herein, an assumption is that the dynamic image in the RAM is previously generated and stored in the RAM.

The dynamic image stored previously in the RAM includes, e.g., an image of a door unit of a car in an open state. Further, an image corresponding to numerals such as "4623" representing a mileage in FIG. 2 is also categorized into the dynamic image. In the example of FIG. 2, on the RAM, pieces of data stored in an area starting with an address "0x3000" and ending with an address "0x301F" represent strip-shaped segmental images formed by slicing a rectangle circumscribing a numeral "4" in a horizontal direction. Each segmental image includes data corresponding to, e.g., a line of 8 pixels in the horizontal direction.

In the example of FIG. 2, the data specified by the address "0x3000" corresponds to the uppermost strip-shaped segmental image within the rectangle circumscribing the numeral "4". Further, the data specified by the address "0x3001" (indicated by +1 in the RAM in FIG. 2) corresponds to the second segmental image from the top in the rectangle. Still further, the data specified by the address "0x301F" (indicated by +F in the line of 0x3010 in the RAM in FIG. 2) corresponds to the lowermost segmental image within the rectangle. Note that these segmental images may also be stored in the flash ROM.

In the information processing device, the CPU links up with the LCD controller, thereby combining the dynamic image with the background image and outputting the combined images to the display device. The CPU generates data structures such as a command descriptor and a descriptor, and starts up a process of the LCD controller.

The descriptor (corresponding to pixel description data) is stored with 2-tuple data such as a position (position data) on the pixel array of the display device and an on-RAM or on-ROM storage address of the image data that is displayed in this position. The example in FIG. 2 is that "Dest." is the data representing the position on the pixel array of the display device. For example, "0x000" (which is expressed simply by "0" in the pixel array in FIG. 2) represents an upper position on the left side of the pixel array. Further, "0x642" represents a position of the uppermost segmental image of the numeral "4" on the screen of the display device. Still further, "0x643" indicates a position of the rightward pixel array neighboring to the position of "0x642". Yet further, "0x653" indicates a position of the downward pixel array neighboring to 20x642". Herein, however, a presumption is that one set of pixels is organized by plural pieces (e.g., eight pieces) of pixels arranged in the horizontal direction, thereby enabling the position of the pixel array to be specified. The minimum unit enabling the position of the pixel array to be specified is normally determined by the standards of the display device.

Moreover, "Source" in the descriptor in FIG. 2 represents an address on the ROM or RAM. "Source" is called a memory address in the embodiment. For instance, "0x8000" is a head address of the image of the car in the flash ROM. Further, e.g., "0x3010" indicates the dynamic image on the RAM.

The command descriptor (corresponding to specifying information) specifies an object that is processed by the LCD controller in the descriptors. The command descriptor includes a "Start" field and an "End" field. Entry numbers of the descriptor are specified in these fields. "N1" and "N2" are stored respectively in the first row of the command descriptor in FIG. 2. Accordingly, it is specified that the data in the N1 entry through the N2 entry may be processed by LCD controller. The CPU can prepare plural sets of these command descriptors.

After the descriptor and the command descriptor such as this have been input to the LCD controller from the CPU, the processes of the LCD controller are started up. It is noted, the CPU may start up the processes of the LCD controller in a way that stores the descriptor and the command descriptor respectively on the RAM and specifies a start address and an end address of the command descriptor.

The LCD controller includes a sequencer and a reload timer. Herein, the reload timer connotes a timer which subtracts a count value from an initial value set according to a clock down to "0" and resets, when the count value reaches "0", this count value to the initial value. The reload timer will hereinafter be simply termed the timer.

The sequencer accepts a process startup command from the CPU. Hereupon, the sequencer reads a range of descriptor that is to be processed from the specified command descriptor. Then, the sequencer processes sequentially the entries of the associated descriptor.

In the example of FIG. 2, the image data of the background image is read out from the flash ROM for a predetermined number of pixels counted from the left-sided upper position of the pixel array with "0" registered in the "Dest.". Then, the readout image data is transferred to the display device. Further, the image data of the dynamic image on the RAM is read for 0x642 in the pixel array of the display device. Subsequently, the readout image data is transferred to the display device. Thus, the car with its door opened or the mileage etc of the car is displayed on the display device.

In FIG. 2, the timer starts up the process by the sequencer of the LCD controller at an interval of a predetermined period of time. The timer is provided, which is because of there being such a case that an input of the image data is requested at the interval of the predetermined period of time by way of specifications of the display device. Namely, for ensuring the data of the internal video RAM, even in a case where there is no change of the displayed image, the input of the image data is requested at the interval of the predetermined period of time depending on the display device. Such being the case, the timer has, if an image data generating interval in the process of the CPU is longer than the requested time interval, a function which gets an already-input image of the last time input to the display device from the LCD controller.

Embodiment 1

Figure 3:
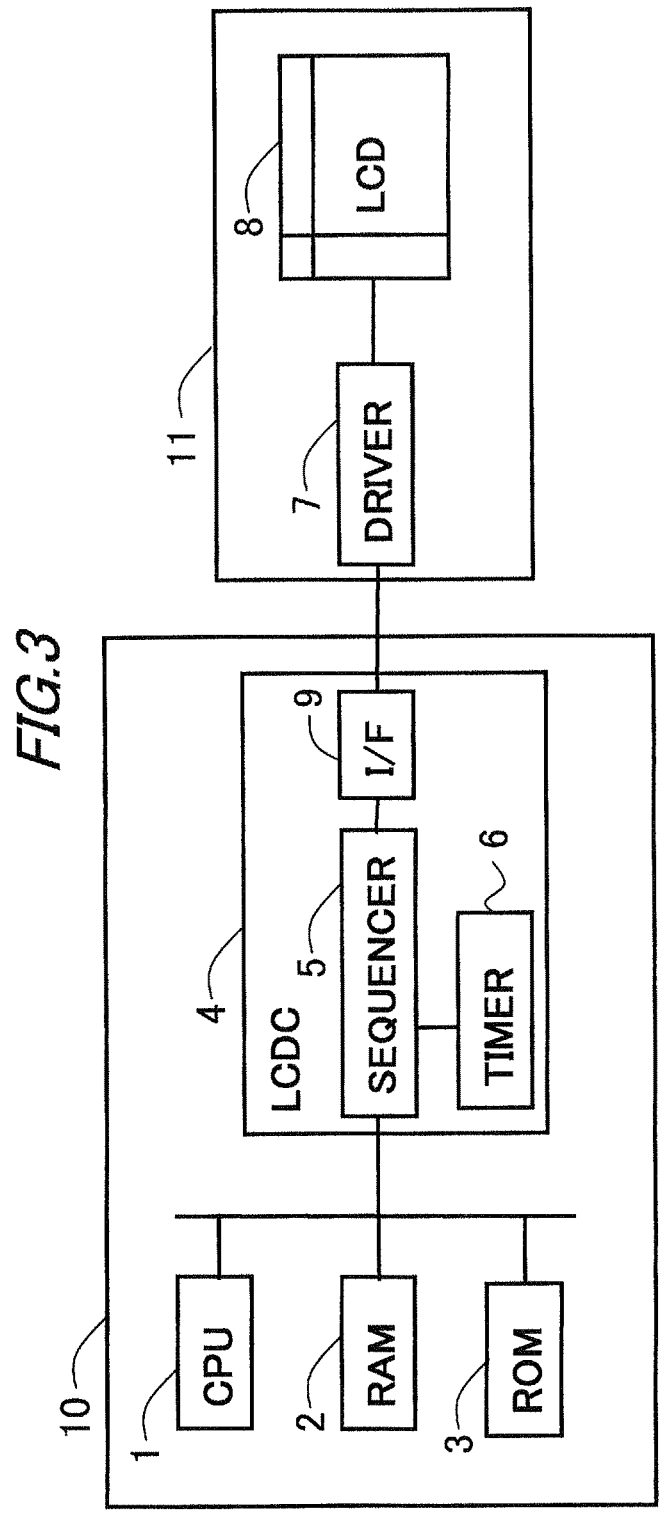
FIG. 3 is a diagram illustrating a hardware configuration of the information processing device and a connection to a display device.

An information processing device 10 according to an embodiment of the present invention will hereinafter be described based on the drawings in FIGS. 3 through 7. FIG. 3 is a diagram illustrating a hardware configuration of the information processing device 10 and how the information processing device 10 is connected to a display device 11.

As depicted in FIG. 3, the information processing device 10 includes a CPU 1 (corresponding to an processing device), a RAM 2, a ROM 3 and an LCD controller 4 (corresponding to a display control device). The CPU 1 executes programs loaded into the RAM 2, thereby providing functions of the information processing device 10. The RAM retains the programs executed by the CPU 1, the data processed by the CPU 1 or the data that is read by the LCD controller 4. The ROM 3 retains, e.g., the fixed background image. The ROM 3 may, however, be stored with the individual segmental images (the strip-shaped segmental images of the dynamic image illustrated in FIG. 2) forming the dynamic image. The RAM 2 and the ROM 3 correspond to an image storage unit.

The LCD controller 4 includes a sequencer 5 (corresponding to a control unit), a timer 6 and an interface 9. The sequencer 5 is a dedicated processor which receives inputs of the command descriptor and the descriptor and outputs corresponding pieces of image data to the display device 11. The interface 9 transmits the output signal from the sequencer 5 to a driver 7. The LCD controller 4 is connectable via the interface 9 to the display device 11.

The timer 6 undergoes setting of the time interval that is measured from the outside of the LCD controller 4, e.g., from the CPU 1, and starts up the process of the sequencer 5 at this time interval. With this contrivance, even when the CPU 1 does not start up the process for the LCD controller 4, it follows that the image data (of which a content is the same image as what is in the process of being already displayed) is transmitted to the display device 11 from the LCD controller 4.

The embodiment does not set any particular limit with respect to the display device 11. The display device 11 assumed herein is what includes the driver 7 accepting the data in a predetermined command format and the display unit such as an LCD 8 driven by the driver 7. The display unit, if configured to output image dot patterns (which will hereinafter be referred to as the image data) in monochrome or colors in respective positions corresponding to the pixel arrays, is not limited to the LCD 8. The following discussion, however, will exemplify the LCD 8. The driver 7 receives the input of the image data in the predetermined format and outputs the image data to the positions corresponding to the pixel arrays.

Figure 4:
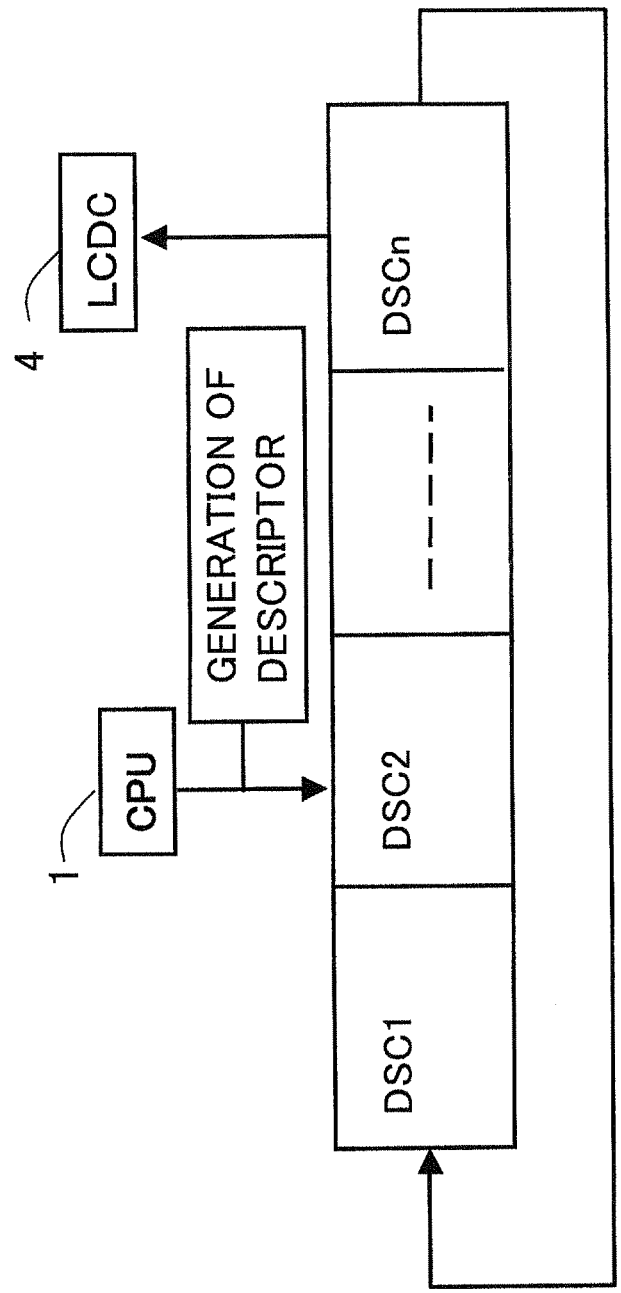
FIG. 4 is a diagram illustrating how data is transferred and received between a CPU and an LCD controller.

FIG. 4 illustrates how the data is transferred and received between the CPU 1 and the LCD controller 4. The CPU 1 prepares in a descriptor format the image data that is displayed on the display device 11. Then, the CPU 1 specifies a processing range with the command descriptor and starts up the processes of the LCD controller 4. The LCD controller 4, of which the processes are thereby started up, processes sequentially the descriptors within the specified range.

At this time, the CPU 1 may, asynchronously with the process of the LCD controller 4, generate the descriptor in an entry that is not yet processed by the LCD controller 4. Namely, the entry other than the entry, which is now in the middle of being processed by the LCD controller 4, can be ensured with a combination of the descriptor and the command descriptor. The descriptor is thereby used as a FIFO (First In First Out) buffer.

The processes of the information processing device 10 will hereinafter be described with reference to FIGS. 5 through 9. Explained herein is an example in which the information processing device 10 monitors a state of the system, generates the descriptor when the state changes, and starts up the processes of the LCD controller 4. Herein, the system is defined as, e.g., a vehicle, and the state is defined as a signal from a sensor provided in the vehicle.

FIG. 5 is a diagram of a structure of an arrangement information table which defines a relationship between items of information to be displayed and positions on the pixel arrays to be displayed. This table is stored in, e.g., the RAM 2. The table retains the information to be displayed and the position on the pixel array to be displayed by way of information-position pairs. Accordingly, for example, when a door D1 sensor of the car notifies the CPU 1 that a door D1 opens, the CPU 1 can specify the position on the pixel array to which the segmental image representing the change in state is output with reference to the arrangement information table. The structure is the same with a case in which other items of information such as the mileage is displayed. In the example of FIG. 5, the mileage is defined in four digits, and the position on the pixel array is specified on a per-digit basis.

The table in FIG. 5, however, illustrates a concept of facilitating comprehension, and there is no implication that the program to be implemented utilizes the table in FIG. 5 as it is. Namely, the program, which is actually implemented in the information processing device 10, without having identifying information like [door D1 sensor] as the information to be displayed, simply may retain the entry number of the table stored with the position (0x3100 etc) on the pixel array which is associated with the "door D1 sensor" or may retain an address on the RAM 2, which is associated with the entry of the table.

FIG. 6 is a diagram of a structure of a segmental image address table that defines a relationship between the information to be displayed and an address on the RAM 2, which is stored with the image data of the information to be displayed. This table is stored with the information to be displayed and the storage address, on the RAM 2 or the ROM 3, of the image data of the segmental image of the information to be displayed by way of information-address pairs.

For example, the door D1 sensor of the car notifies the CPU 1 that the door D1 opens, and the CPU 1 can acquire addresses "0x3100", "0x3101", etc on the RAM 2, which are associated with an image of the opened door D1, by referring to the segmental image address table. Further, for instance, when the numeral "0" is to be displayed as the numeral data, it is feasible to acquire memory addresses "0x2900-0x291F" in which to store the image data, these addresses being associated with the numeral "0". Similarly to the case in FIG. 5, however, the actual program may utilize the entry number of the segmental image address table stored with the on-memory addresses of the respective segmental images or may utilize the address, on the RAM 2, associated with this entry.

Figure 7:
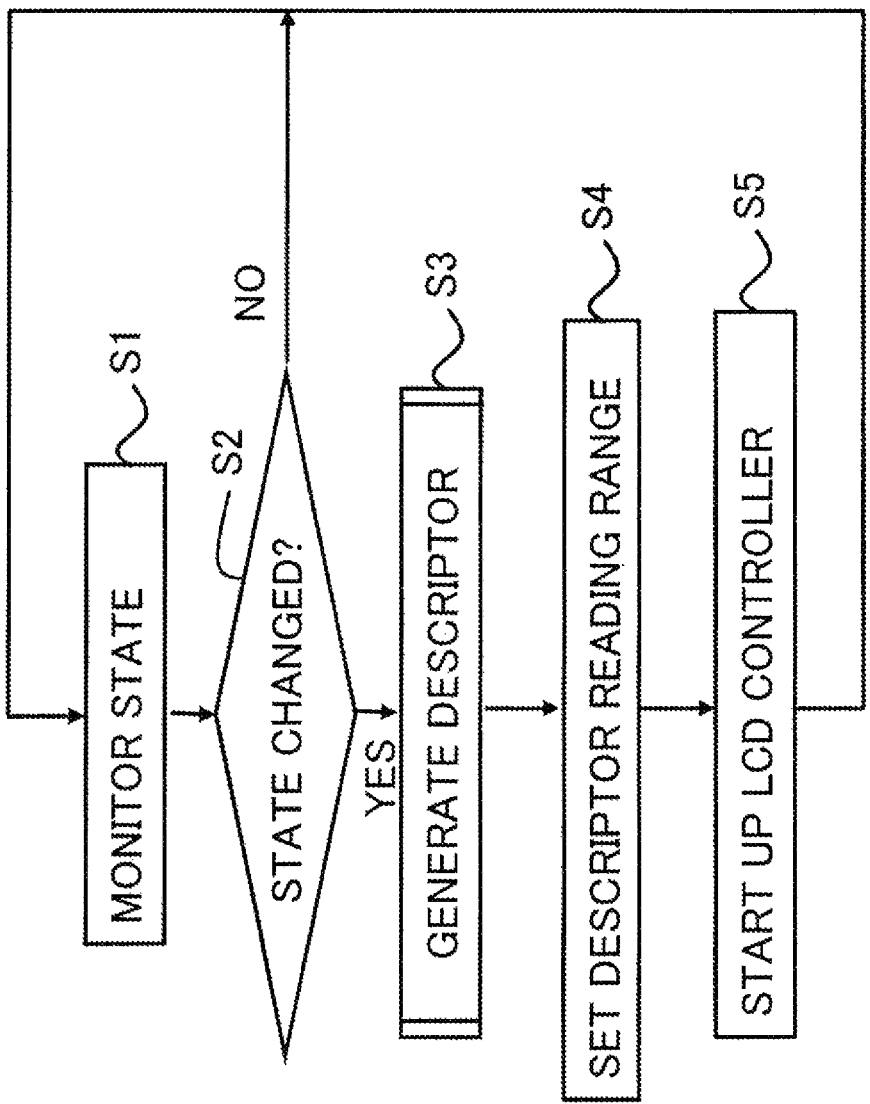
FIG. 7 is a flowchart illustrating a processing procedure of the CPU of the information processing device.

FIG. 7 is a flowchart illustrating a processing procedure of the CPU 1. In this process, the CPU 1 normally monitors the state (S1).

Then, the CPU 1 determines whether the state changes or not (S2). If there is no change in state, the CPU 1 loops back the control to S1. Whereas if there is the change in state, the CPU 1 generates the descriptor for displaying the change in state (S3). The CPU 1 executing the process in S3 corresponds to a generating unit. For example, when the open state of the door of the car is detected, the address, on the RAM 2, of the segmental image representing the open state thereof and the position of the pixel array in which the segmental image is displayed, are recorded as an address-position pair in the descriptor. Further, the background image address on the ROM is set with respect to the area with no change in state.

Next, the CPU 1 sets a reading range of the descriptor in the command descriptor (S4). Then, the CPU 1 starts up the processes of the LCD controller 4 (S5). The CPU 1 executing the process in S5 corresponds to a command unit. Thereafter, the CPU 1 loops back the control to S1.

Figure 8:
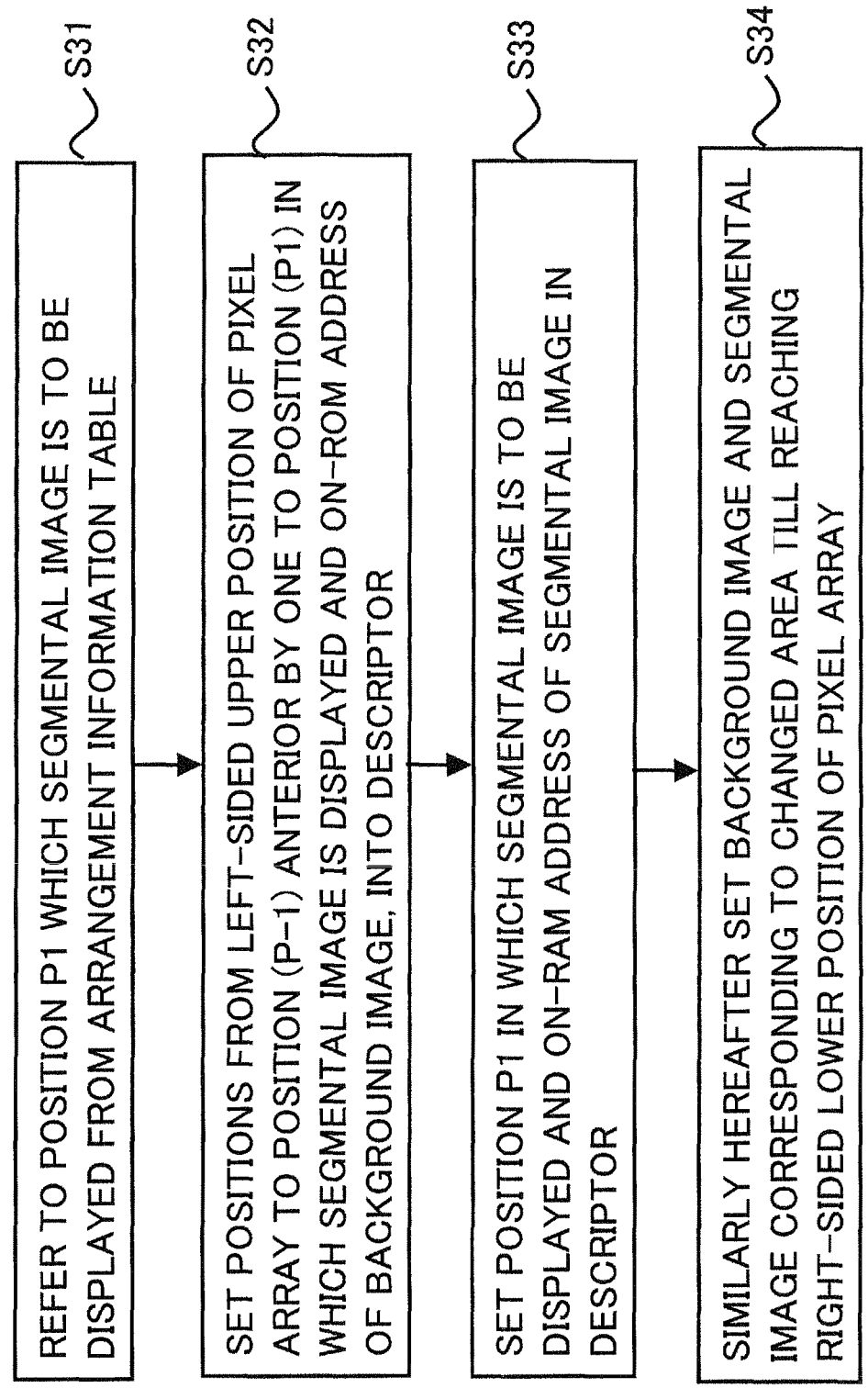
FIG. 8 is a flowchart illustrating details of a descriptor generating process.

FIG. 8 is a flowchart illustrating details of the descriptor generating process (S3 in FIG. 7). In this process, the CPU 1 refers to the position (which is assumed to be, e.g., P1) in the arrangement information table, in which the segmental image is displayed, corresponding to the signal of the sensor from which the change in state is detected (S31). For example, the door D1 sensor of the car notifies the CPU 1 of a purport that the door D1 opens, and the CPU 1 specifies the position of the pixel array in the arrangement information table, in which the segmental image representing the open state of the door D1 is to be displayed.

Next, the CPU 1 sets, in the descriptor, positions from the left-sided upper position of the pixel array to a position (P1-1) anterior by one to the position (P1) in which the segmental image is displayed and an on-ROM address of the background image (S32).

Then, the CPU 1 sets the position P1 in which the segmental image is displayed and the on-RAM address of the segmental image in the descriptor (S33). Hereafter, the CPU 1 similarly sets the background images and the segmental images corresponding to the areas with occurrence of the changes in the descriptors till reaching the right-sided lower position of the pixel array (S34). The descriptor is generated through these processes.

Figure 9:
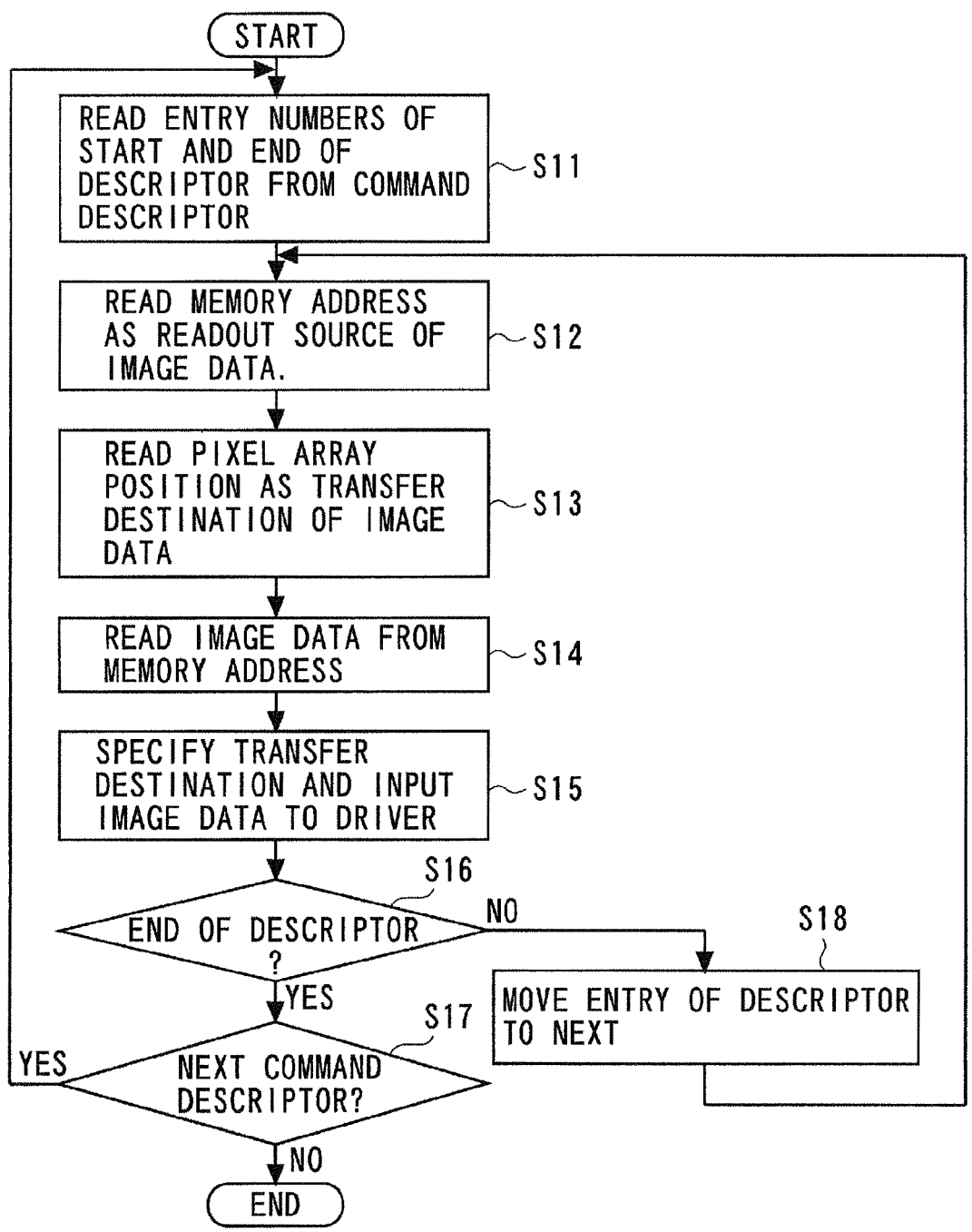
FIG. 9 is a flowchart illustrating processes of a sequencer.

FIG. 9 illustrates processes of the sequencer of the LCD controller 4. The sequencer 5, upon receiving a startup command from the CPU 1, executes the processes in FIG. 9. A computer program on the sequencer, which realizes these processes, corresponds to a display control program. Even when receiving none of the startup command from the CPU 1, the sequencer 5 receives the command from the timer 6 and executes the processes in FIG. 9. In this case, the timer starts up the processes of the sequencer 5 at a time interval specified in the specifications of the display device 11.

In this process, the sequencer 5 reads the entry numbers of the start and the end of the descriptor from the command descriptor (S11). The sequencer 5 executing this process corresponds to a specifying information acquiring unit.

Then, the CPU 1 reads, out of the descriptor, a source address (Source) on the memory from which the image data is read (S12). Further, the sequencer 5 reads a pixel array position to which the image data is transferred (S13). The sequencer 5 executing the processes in S12 and S13 corresponds to a pixel description data acquiring unit.

Subsequently, the sequencer 5 reads the image data from the address on the memory (S14). The sequencer 5 executing this process corresponds to an image reading unit. Moreover, the sequencer 5 inputs the image data via the interface 9 to the driver 7 of the display device 11, together with the transfer destination on the pixel array (S15).

Next, the sequencer 5 determines whether the (data of) entry of the end of the descriptor is processed or not (S16). If not yet processed down to the end of the descriptor, the sequencer 5 moves the entry of the descriptor to the next position (S18). Then, the sequencer 5 loops back the control to S12. While on the other hand, if processed down to the end of the descriptor, the sequencer 5 determines whether or not the information (the 2-tuple data of "Start" and "End" illustrated in FIG. 2) indicating the next descriptor is left in the command descriptor (S17).

If the next descriptor is left, the sequencer loops back the control to S11. Whereas if the next descriptor is not left, the sequencer 5 finishes the process.

As discussed above, according to the information processing device in the embodiment, the CPU 1 may simply specify, in the descriptor, the address of the image data to be displayed and the position on the pixel array of the display device 11 on which the image data is displayed, and start up the processes of the sequencer 5. The address of the segmental image of the dynamic image against the background image may simply be specified in the descriptor. Accordingly, as compared with a case of individually rewriting all of the changing portions, a load on the CPU can be reduced.

Further, in the embodiment, the background image and the segmental images of the dynamic image are prepared beforehand and associated through the descriptor. Hence, in the comparison with a case of copying and rewriting the background image to the RAM 2 as hitherto done, a data quantity of the memory for the operation in the middle of editing the image can be decreased.

Modified Example

The embodiment, as illustrated in FIG. 2, the descriptor is structured so that the position ("Dest.") on the pixel array of the display device 11 and the on-RAM storage address ("Source") of the image data that is displayed in this position, are organized as the position-address pair. This structure of the descriptor may further include a data length.

To be specific, the descriptor may be structured to have 3-tuple data of "Dest.", "Source" and "Length". FIG. 10 illustrates an example of the descriptor in this case. In this example, the data having a data length "0x642" from an address "0x8000" on the memory is specified as the data ranging from the left-sided upper position (Dest.=0) of the pixel array to "0x641". The data of "Length" in this case represents the number of data undergoing the data transfer specified by the minimum data unit which is a data size stored in a location specified by an address of the RAM or the flash ROM. With this scheme, the background image ranging from the left-sided upper position of the image to the position just anterior to the position of the dynamic image which appears first is specified by one row of the descriptor.

In FIG. 10, with respect to a position "0x642" of the pixel array, an address "0x3000" of the segmental image on the memory is specified, and a length "0x001" is specified. Namely, one piece of data undergoing the data transfer is specified by the minimum data unit. Thus, the descriptor includes the "Length", thereby enabling the descriptor to be structured in the form of reducing the number of the descriptors.

Namely, when the background images are consecutive, the number of consecutive images is set in "Length", whereby the plural pieces of data undergoing the data transfer specified by the minimum data unit can be specified batchwise to be pixel array owing to the 3-tuple data ("Dest.", "Source" and "Length") (one set of data) of the descriptor. This contrivance enables both of the data size of the descriptor and the load on the CPU 1 to be reduced further.

Embodiment 2

The embodiment is a display control device linking up with an information processing device having an image storage unit and with a display device displaying an image by setting image data for respective pixels of a pixel array, and displaying on the display device the image data read from the image storage unit of the information processing device. The display control device acquires pixel description data containing a combination of position information specifying a position on the pixel array and address information specifying an address, on the image storage unit, of the image data that is displayed in the specified position. Further, the display control device reads the image data from the address, on the image storage unit, specified by the address information. Then, the display control device specifies the position on the pixel array, specified by the pixel description data and inputs the readout image data to the display device.

With this configuration, the display control device can acquire an image display request owing to the combination of the position information for specifying the position on the pixel array and the address information for specifying the address, on the image storage unit, of the image data that is displayed in this specified position, and can get the image displayed on the display device. Accordingly, the display control device can acquire the pixel description data organized by combining, e.g., the fixed background image with the dynamic image against the background image, and can get the image displayed on the display device. In this case, the information processing device linking up with the display control device may simply generate the pixel description data and request the display control device to process the data.

Further, the display control device may acquire specifying information for specifying the pixel description data that is acquired by the pixel description data acquiring unit in plural pieces of pixel description data. With this configuration, the display control device can select the pixel description data to be processed among the plural pieces of pixel description data and can process the data.

The pixel description data may further contain data length information for specifying a data quantity of the image data, and the image reading unit may read the image data having the data quantity specified by the data length information. With this configuration, the display control device can read the image data having the data quantity specified by the data length information and can display the data on the display device. Accordingly, the information processing device linking up with the display control device, in the case of consecutively displaying the image data from the address specified by the address information, may simply generate the pixel description data in a way that specifies the data length information equivalent to the image data quantity, and request the display control device to process the data.

<<Readable-by-Computer Recording Medium>>

A program for making a computer, other machines and devices (which will hereinafter be referred to as the computer etc) realize any one of the functions can be recorded on a recording medium readable by the computer etc. Then, the computer etc is made to read and execute the program on this recording medium, whereby the function thereof can be provided.

Herein, the recording medium readable by the computer etc connotes a recording medium capable of storing information such as data and programs electrically, magnetically, optically, mechanically or by chemical action, which can be read from the computer etc. Among these recording mediums, for example, a flexible disc, a magneto-optic disc, a CD-ROM, a CD-R/W, a DVD, a DAT, an 8 mm tape, a memory card, etc are given as those removable from the computer.

Further, a hard disc, a ROM (Read-Only Memory), etc are given as the recording mediums fixed within the computer etc.

All example and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A display control device, comprising:
a sequencer configured to:
acquire, from a command descriptor table, a starting entry number and an ending entry number,
acquire, from a descriptor table separate from the command descriptor table, a plurality of source addresses and a plurality of destination addresses, the plurality of source addresses including at least one memory address of a first memory device and at least one memory address of a second memory device, each of the plurality of source addresses corresponding to a different one of the plurality of destination addresses, wherein the starting entry number corresponds to a starting source address of the plurality of source addresses and a starting destination address of the plurality of destination addresses, and the ending entry number corresponds to an ending source address of the plurality of source addresses and an ending destination address of the plurality of destination addresses,
access the plurality of source addresses starting with the starting source address and ending with the ending source address to read image data from the first memory device and read background image data from the second memory device; and
transmit the image data, the background image data, and the plurality of destination addresses to a driver of a display device without rewriting the image data with the background image data together on the first memory or the second memory; and
a timer configured to measure a time interval, external to the display control device, and start up a process of the sequencer at the time interval.

2. The display control device of claim 1, wherein the driver of the display device displays the image data on a pixel array starting at the starting destination address and ending at the ending destination address.

3. The display control device of claim 1, wherein the timer measures the time interval from a processing device.

4. An information processing device comprising:
a first memory configured to store image data;
a second memory configured to store background image data;
a display control device configured to:
acquire, from a command descriptor table, a starting entry number and an ending entry number,
acquire, from a descriptor table separate from the command descriptor table, a plurality of source addresses and a plurality of destination addresses, the plurality of source addresses including at least one memory address of the first memory and at least one memory address of the second memory, wherein each source address corresponds to a different destination address,
use the starting entry number and the ending entry number to access the plurality of source addresses to read image data from the first memory and read background image data from the second memory, and
transmit the image data, the background image data, and the plurality of destination addresses to a driver of a display device without rewriting the image data with the background image data together on the first memory or the second memory; and a processing device configured to:
  generate the command descriptor table and the descriptor table, and
  command the display control device to start up processes with information from the command descriptor table and the descriptor table.

5. The information processing device of claim 4, wherein the driver of the display device displays the image data on a pixel array starting at a starting destination address corresponding to the starting entry number and ending at an ending destination address corresponding to the ending entry number.

6. A non-transitory storage medium storing a display control program including instructions that, when executed by a computer, cause the computer to perform operations comprising:
  acquiring, from a command descriptor table, a starting entry number and an-ending entry number;
  acquiring, from a descriptor table separate from the command descriptor table a plurality of source addresses and a plurality of destination addresses, the plurality of source addresses including at least one memory address of a first memory device and at least one memory address of a second memory device, each of the plurality of source addresses corresponding to a different one of the plurality of destination addresses, wherein the starting entry number corresponds to a starting source address of the plurality of source addresses and a starting destination address of the plurality of destination addresses, and the ending entry number corresponds to an ending source address of the plurality of source addresses and an ending destination address of the plurality of destination addresses;
  accessing the plurality of source addresses starting with the starting source address and ending with the ending source address to read image data from the first memory device and read background image data from the second memory device;
  transmitting the image data, the background image data, the starting destination address and the ending destination address to a driver of a display device without rewriting the image data with the background image data together on the first memory or the second memory; and
  controlling the display device to display the image data on a pixel array starting at the starting destination address and ending at the ending destination address.

7. A display control method, comprising:
  acquiring, from a command descriptor table, a starting entry number and an ending entry number;
  using the starting entry number and the ending entry number, acquiring, from a descriptor table separate from the command descriptor table, a plurality of source addresses and a plurality of destination addresses, the plurality of source addresses including at least one memory address of a first memory device and at least one memory address of a second memory device, wherein each source address corresponds to a different destination address;
  reading image data from the first memory device and background image data from the second memory device, using the plurality of source addresses;
  transmitting the image data, the background image data, and the plurality of destination addresses to a driver of a display device without rewriting the image data with the background image data together on the first memory or the second memory; and
  controlling the display device to display the image data on a pixel array starting at the starting destination address and ending at the ending destination address.

* * * * *